Aug. 5, 1924.
R. E. WYATT
TOY VEHICLE
Filed May 9, 1923
1,504,177
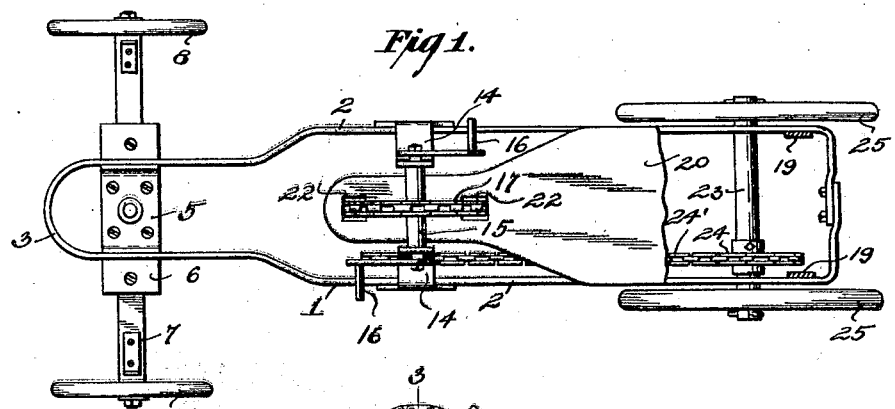
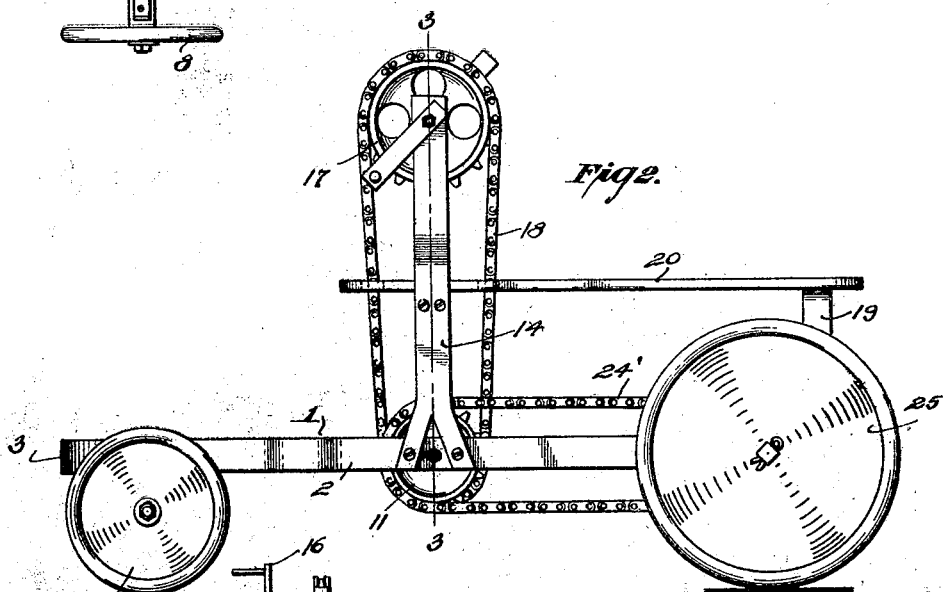
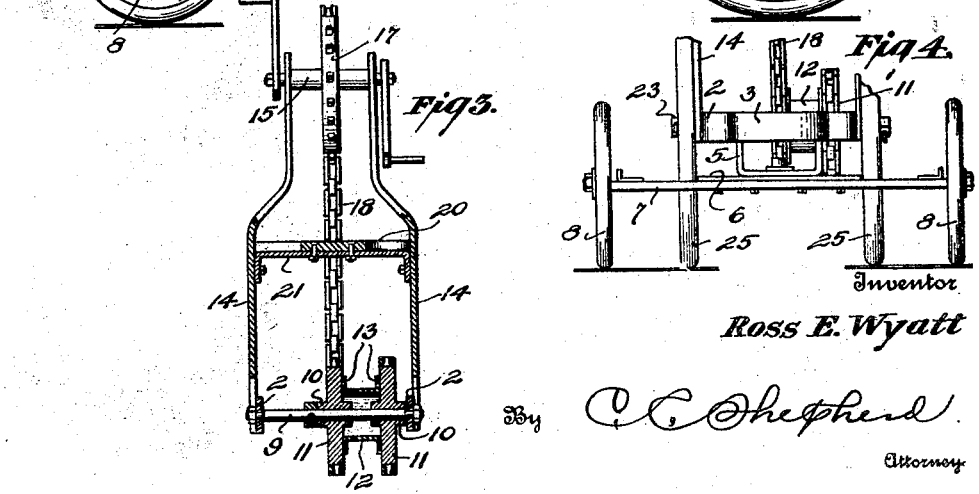
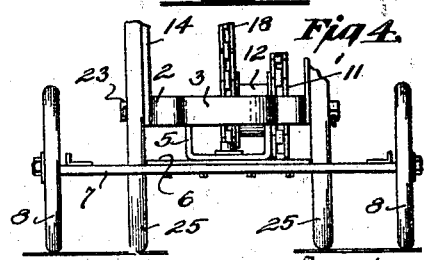
Inventor
Ross E. Wyatt
By C. C. Shepherd
Attorney Patented Aug. 5, 1924.

1,504,177

UNITED STATES PATENT OFFICE.

ROSS E. WYATT, OF MANSFIELD, OHIO.

TOY VEHICLE.

Application filed May 9, 1923. Serial No. 637,864.

*To all whom it may concern:*

Be it known that I, ROSS E. WYATT, a citizen of the United States, residing at Mansfield, in the county of Richland and State of Ohio, have invented certain new and useful Improvements in Toy Vehicles, of which the following is a specification.

The present invention is directed to improvements in manually propelled vehicles for use by children.

The primary object of the invention is to provide a device of this kind so constructed that the child occupying a seat thereof can with little effort propel and guide the vehicle.

A further object of the invention is to provide a vehicle of this character which is extremely simple in construction, compact, and one which can be manufactured at a very small cost.

A still further object of the invention is to provide novel means for operatively associating the wheeled frame and propelling mechanism.

With these and other objects in view, as will appear as the description proceeds, the invention consists in the novel features of construction, combinations of elements and arrangements of parts, hereinafter fully described and pointed out in the appended claim.

In the accompanying drawing:

Figure 1 is a top plan view of the device,

Figure 2 is a side elevation thereof,

Figure 3 is a sectional view on line 3—3 of Figure 2, and

Figure 4 is a fragmentary front elevation.

Referring to the drawing 1 designates the frame which consists of side bars 2 which are integrally connected at their front ends by a loop 3, the rear ends of the side bars being overlapped and secured as at 4.

Secured between the bars 2 adjacent the loop 3 is a U shaped bracket 5 the bit portion of which having pivotally connected thereto a plate 6, said plate in turn having the axle 7 fixed thereto, said axle being provided with wheels 8.

A shaft 9 is employed and has its ends fixed to the side bars 2 and intermediate the ends thereof said shaft having rotatably engaged thereon the hubs 10 of the sprockets 11. In order to hold the sprockets 11 in spaced relation a bushing 12 is employed, said bushing having end flanges 13 which are adapted to be bolted to the inner faces of the sprocket wheels 11.

A pair of standards 14 are provided and have their lower ends forked and bolted to the side bars 2, the upper ends of said standards having journaled therein a shaft 15, said shaft having crank handles 16 secured to its outer ends, and fixed centrally of the shaft 15 is a sprocket wheel 17, said sprocket wheel having trained thereover a sprocket chain 18 which also is trained around the aligned sprocket wheel 11. Supported by the rear end of the frame 1 is a bracket 19 and supported by said bracket is the rear end of the seat 20, the forward end of which being reduced and extended between the standards 14, there being a support 21 secured to the standards and to which the seat is secured. A pair of openings 22 are formed in the seat through which the sprocket chain 18 can travel.

Supported by the bars 2 adjacent the rear end of the frame 1 is an axle 23, said axle having fixed thereto a sprocket wheel 24, said sprocket wheel being aligned with one of the sprockets 11 and trained around said sprockets is a sprocket chain 24'. The axle 23 has connected therewith in the usual manner rear wheels 25.

It will be obvious that when the crank handles 16 are grasped and rotated that the sprocket chain 18 will be compelled to travel, thereby rotating the sprocket wheels 11 and consequently the sprocket chain 24' which in turn imparts rotary movement to the rear axle 23 to drive one of the wheels 25, it being of course understood that one of these wheels as is customary is loose upon the axle. The child when occupying the seat 20 can conveniently actuate the crank handles 16 and place the feet upon the axle 7 to guide the vehicle when it is being propelled.

What is claimed is:

In a device of the class described, the combination with a frame including a pair of side bars, a wheeled axle for supporting the front end of said frame, a wheeled axle for supporting the rear end of said frame, a sprocket secured to the rear axle, a pair of standards supported by the side bars, a crank actuated shaft journaled in the upper ends of the standards, a sprocket secured to said shaft, a pair of sprockets supported between the base, a sprocket chain connecting one of the sprockets and the second named sprocket, a sprocket chain connecting the other sprocket and the sprocket on the rear axle, a seat having its rear end supported by the frame and its forward end engaged between and supported by said standards, said seat having openings therein for passage of one of the sprocket chains.

In testimony whereof I affix my signature.

ROSS E. WYATT.